United States Patent [19]
Hayashi

[11] 3,796,049
[45] Mar. 12, 1974

[54] EXHAUST GAS RECIRCULATION SYSTEM FOR AN INTERNAL COMBUSTION ENGINE

[75] Inventor: Yoshimasa Hayashi, Yokohama, Japan

[73] Assignee: Nissan Motor Company, Limited, Yokohama City, Japan

[22] Filed: Dec. 26, 1972

[21] Appl. No.: 318,404

[30] Foreign Application Priority Data
Dec. 25, 1971  Japan............................. 46-3837

[52] U.S. Cl.................. 60/278, 60/290, 123/119 A
[51] Int. Cl......................... F01n 3/00, F02m 25/06
[58] Field of Search.......... 123/119 A; 60/278, 289, 60/290, 304, 305, 306, 307

[56] References Cited
UNITED STATES PATENTS

| 3,479,816 | 11/1969 | Masters............................... 60/290 |
| 3,500,807 | 3/1970 | Daigh.................................. 60/305 X |
| 3,643,640 | 2/1972 | Kraus et al..................... 123/119 A |
| 3,648,455 | 3/1972 | Muroki................................ 60/290 |
| 3,672,340 | 6/1972 | Bomba............................. 123/119 A |
| 3,748,855 | 7/1973 | Day....................................... 60/290 |
| 3,749,071 | 7/1973 | Gumbleton et al............. 123/119 A |

Primary Examiner—Al Lawrence Smith
Assistant Examiner—Tony Argenbright

[57] ABSTRACT

An exhaust gas recirculation system for an internal combustion engine and adapted for recircurating a portion of engine exhaust gases from the exhaust manifold to the intake manifold to reduce the quantity of nitrogen oxides contained in the finally discharged exhaust gases. The exhaust gas recirculation system has an exhaust gas recirculation conduit communicating at its one end with the exhaust manifold and at the other end with the intake manifold, and a flow control valve disposed in the exhaust gas recirculation conduit to control the rate or amount of exhaust recirculation. The flow control valve is responsive to the pressure of secondary air of a secondary air supplying device incorporated in the engine, the pressure of secondary air being controlled in dependence on the variations in intake manifold vacuum.

7 Claims, 6 Drawing Figures

EXHAUST GAS RECIRCULATION SYSTEM FOR AN INTERNAL COMBUSTION ENGINE

This invention relates to an exhaust gas recirculation system for an internal combustion engine and, more particularly, to a system adapted to reduce the quantity of toxic nitrogen oxides contained in engine exhaust gases.

In order to reduce the quantity of nitrogen oxides in engine exhaust gases, various attempts have been made including a sheme of continuously recirculating a portion of the engine exhaust gases to the intake manifold of the engine. In this known practice, the engine exhaust gases are partially recirculated in a continuous fashion to the intake manifold and added to an air-fuel mixture to be supplied into the engine to reduce the combustion temperature.

This reduction in the flame temperature prevents the reaction that would otherwise take place between nitrogen and oxygen during the combustion. Thus, the quantity of nitrogen oxides contained in the finally discharged exhaust gases can be reduced significantly.

In spite of the considerable reduction in the quantity of nitrogen oxides in the engine exhaust gases, continuous recirculation of the exhaust gases without respect of the operating conditions of the engine, as has thus far been the practice, results in unstable engine operation, decreased power output and contamination within the engine and, as such, has been considered unsuitable for practical purposes.

It is, therefore, an object of the present invention to provide an improved exhaust gas recirculation system for an internal combustion engine.

Another object of the present invention is to provide an exhaust gas recirculation system for an internal combustion engine wherein means is provided for controlling the rate or amount of exhaust gases recirculated into the intake manifold of the engine.

Another object of the present invention is to provide an exhaust gas recirculation system for an internal combustion engine, which system is adapted to control the rate or amount of exhaust gases recirculated into the intake manifold of the engine in dependence on varying operating conditions of the engine.

Still another object of the present invention is to provide an exhaust gas recirculation system for an internal combustion engine having a device for supplying secondary air into the exhaust manifold of the engine.

A further object of the present invention is to provide an exhaust gas recirculation system for an internal combustion engine having a device for supplying secondary air into the exhaust manifold of the engine, which system is combined with the secondary air supplying device for controlling the rate or amount of exhaust gases recirculated into the intake manifold of the engine.

A still further object of the present invention is to provide an exhaust gas recirculation system for an internal combustion engine, which system is durable in operation, simple in construction and economical to manufacture.

These and other objects and features of the present invention will become more apparent from the following description when taken in conjunction with the accompanying drawings; in which.

Figure 1:
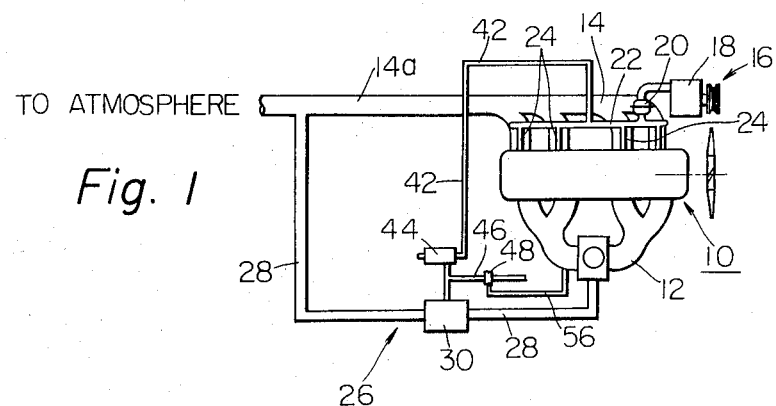
FIG. 1 is a schematic view of a preferred embodiment of the exhaust gas recirculation system according to the present invention as combined with a conventional secondary air supplying device incorporated in an internal combustion engine.

Referring now to FIG. 1, there is schematically shown a preferred embodiment of the exhaust gas recirculation system implementing the present invention. The exhaust gas recirculation system proposed by the present invention is specifically suited for use in an automotive internal combustion engine having a secondary air supply device adapted to supply secondary air into the exhaust manifold to facilitate oxidation of the unburned hydrocarbons and carbon monoxide in the engine exhaust gases, as will be clearly described hereinafter in detail. The engine, which is generally designated by reference numeral 10, has, as customary, an intake manifold 12 through which a calibrated air-fuel mixture is passed into the combustion chambers (not shown) of the engine, and an exhaust manifold 14 which is connected to an exhaust pipe 14a through which exhaust gases emitted from the engine are discharged into the atmosphere. The engine 10 to which the exhaust gas recirculation system of the present invention is applied has also a secondary air supplying device 16.

In FIG. 1, the secondary air supply device 16 is shown as comprising a pneumatic pump 18 which is adapted to be driven by the engine 10 to suck in atmospheric air to be supplied to the engine as secondary air. As shown, the pneumatic pump 18 communicates through a check valve 20 with an air gallery 22 and delivers atmospheric air thereto. The atmospheric air delivered to the air gallery 22 is then supplied through respective secondary air injection nozzles 24 into a plurality of exhaust ports (not identified) as secondary air so that the oxidation of unburned exhaust gases emitted from the exhaust ports is accelerated and promoted.

According to one feature of the present invention, the exhaust gas recirculation system of the present invention is combined with the secondary air supply device which has been mentioned hereinabove so that the rate or amount of exhaust gases recirculated into the intake manifold is related to the secondary air pressure in the air gallery. More specifically, the exhaust gas recirculation system, generally indicated at 26, comprises an exhaust gas recirculation conduit 28 having one end connected to the exhaust pipe 14a and the other end connected to the intake manifold 12 of the engine 10 to allow a portion of the exhaust gases passing through the exhaust pipe 14a to be recirculated into the intake manifold 12 of the engine 10. A flow control valve 30 is disposed in the exhaust gas recirculation conduit 28 to control the rate or amount of exhaust gases recirculated into the intake manifold 12 thereby to prevent reduction in engine power output and also excessive fuel consumption.

Figure 2:
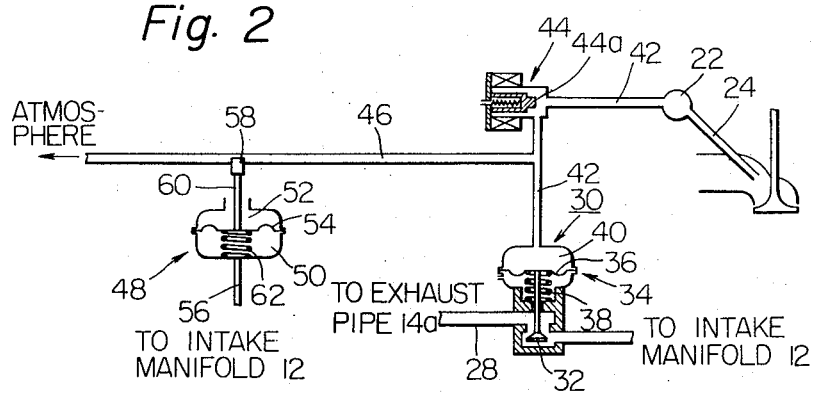
FIG. 2 is a view illustrating a detail construction of an exhaust gas recirculaton control forming part of the system shown in FIG. 1.

As shown in FIG. 2, the flow control valve 30 may comprise a valve head 32 which is located in the exhaust gas recirculation circuit 28 to open and close the same, and a valve actuating device 34. In the embodiment of FIG. 2, the valve actuating device 34 is shown as comprising a diaphragm assembly having a movable member such as a flexible diaphragm 36 to which the valve head 32 is coupled for movements therewith and a compression spring 38 biasing the diaphragm 36 in a direction to cause the valve head, 32 to close the exhaust gas recirculation conduit 28. The diaphragm assembly has also a control chamber 40 communicating with the secondary air gallery 22 through a secondary air passage 42 to receive secondary air therefrom whereby the diaphragm 36 is biased in a direction to cause the valve head 32 to open the conduit 28. Thus, when the secondary air pressure is at an elevated level, the diaphragm 36 is urged against the action of the spring 38 toward a position to cause the valve head 32 to open the conduit. When, in contrast, the secondary air pressure drops below a predetermined valve, then the force exerted by the spring 38 on the diaphragm 36 exceeds the force acting on the diaphragm 36 due to the pressure difference on the opposite sides of the diaphragm 36 and the diaphragm 36 is moved toward a position to cause the valve head 32 to close the conduit 28. A flow shut-off valve 44 is interposed in the secondary air passage 42 to selectively shut-off the secondary air to be introduced into the control chamber 40 when de-energized. This flow shut-off valve 44 may be of any suitable construction such as a solenoid valve and in this embodiment, the solenoid valve is adapted to be de-energized during idling, coasting and light load operating conditions of the engine. The solenoid valve has a plunger 44a. The pressure of secondary air introduced into the control chamber 40 is related to intake manifold vacuum. To this end, a branch passage 46 is connected to the secondary air passage 42 at a point between the control chamber 40 and the flow shut-off valve 44. In the illustrated embodiment of FIG. 2, the branch passage 46 is shown as being vented to the atmosphere. To control the rate or amount of secondary air to be vented to the atmosphere in accordance with the intake manifold vacuum, a diaphragm device 48 is provided which is adapted to respond to the intake manifold vacuum. The diaphragm device 48 has a vacuum chamber 50 and an atmospheric chamber 52 which is separated from the former by a diaphragm member 54. The vacuum chamber 50 communicates with the intake manifold 12 of the engine 10 through a conduit 56, while the atmospheric chamber 52 is vented to the atmosphere. The diaphragm member 54 is connected with a valve element 58 through a connecting rod 60 extending through the atmospheric chamber 52. The valve element 58 is operatively disposed in a suitable position of the branch passage 46 to control the effective cross-sectional area of the branch passage 46. In the vacuum chamber 50 there is mounted a compression spring 62 whereby the diaphragm member 54 is urged toward the atmospheric chamber 52. Thus, when the intake manifold vacuum is at an elevated level, the diaphragm member 54 is urged toward the vacuum chamber 50 against the action of the compression spring 62 thereby to cause the valve element to open the branch passage 46. When, however, the intake manifold vacuum drops below a predetermined level, then the force exerted by the spring 62 on the diaphragm member 54 exceeds the force acting on the diaphragm member 54 due to the pressure difference on opposite sides and the diaphragm member 54 is moved toward the atmospheric chamber 52 to cause the valve element 58 to close the branch passage 46. The compression force of the spring 62 may be selected to yield to vacuum at such predetermined level.

During idling condition of the engine, the quantity of nitrogen oxides contained in the engine exhaust gases will not cause a serious air pollution problem. In this particular condition, the flow shut-off valve 44 is de-energized so that the plunger 44a is moved by the action of the compression spring (not identified) to a position to close the secondary air passage 42. Under this circumstance, secondary air is prevented from being introduced into the control chamber 40 of the valve actuating device 30. Since, in this condition, the control chamber 40 communicates with the atmosphere, the diaphragm member 36 is moved upwardly as viewed in FIG. 2 by the action of the compression spring 38 and, accordingly, the valve head 32 connected to the diaphragm member 36 is moved in the same direction to close the exhaust gas recirculation conduit 28. The exhaust gases are in this manner prevented from entering the intake manifold 12 of the engine 10.

When, on the other hand, the engine is operating at a high speed, nitrogen oxides are produced in quantities which would cause a serious air pollution problem if the nitrogen oxides were all allowed to freely escape into the atmosphere. In this condition, the flow shut-off valve 44 is energized so that the plunger 44a is moved against the action of the spring (not identified) to a position to open the secondary air passage 42. Then, secondary air in the air gallery 22 is admitted through the passage 42 to the control chamber 40 of the valve actuating device 30. In this condition the spring 38 force yields to the force exerted on the diaphragm member 36 due to secondary air pressure and, therefore, the diaphragm member 36 is moved downwardly against the action of the compression spring 38 to cause the valve head 32 to open the exhaust gas recirculation conduit 28. The exhaust gases are thus recirculated into the intake manifold 12 of the engine so that nitrogen oxides in the finally discharged exhaust gases are significantly reduced.

Figure 5:
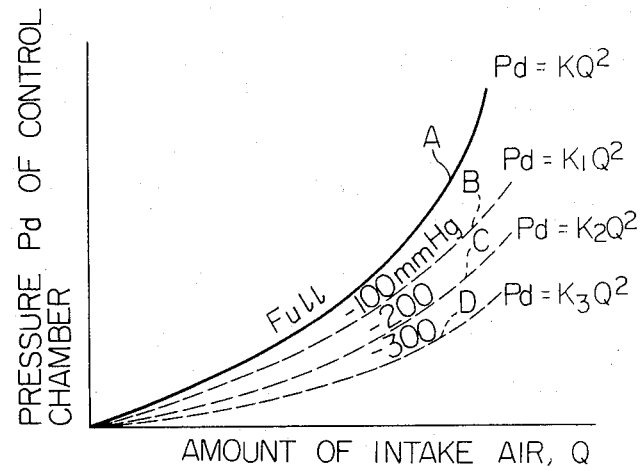
FIG. 5 is a graph showing the relationship between the amount of engine intake air and the pressure in a diaphragm chamber of the exhaust gas recirculation control.
Figure 6:
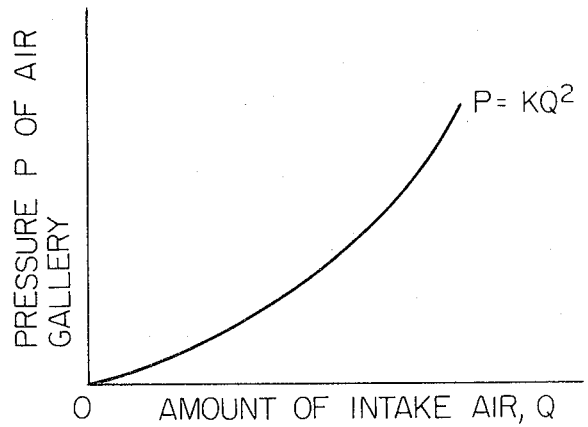
FIG. 6 is a graph showing the relationship between the amount of engine intake air and the pressure in an air gallery of the secondary air supplying device.

As shown in FIG. 6, the pressure of secondary air in the air gallery 22 varies in proportion to the square of the amount of intake air of the engine. This relationship is expressed by an equation $P = K Q^2$, where $P$ represents the pressure in the air gallery 22, $k$ is a constant and $Q$ represents the amount of engine intake air. The pressure of secondary air introduced into the control chamber 40 or the pressure in the control chamber 40 varies in accordance with intake manifold vacuum as shown by curves A, B, C and D in FIG. 5. From the graph of FIG. 5, it will be seen that the pressure $Pd$ in the control chamber 40 decreases as the intake manifold vacuum increases or the throttle opening is decreased. This is because of the fact that the rate or amount of secondary air to be vented to the atmosphere is increased as the intake manifold vacuum increases due to the inherent construction of the diaphragm device 48. Thus, the amount of recirculated exhaust gases increases as the intake manifold vacuum decreases. It should be noted in this instance that since the pressure in the control chamber 40 varies in proportion to the amount of engine intake air, namely, the amount of exhaust gases emitted from the engine, the rate or amount of recirculated exhaust gases varies in proportion to the amount of exhaust gases emitted from the exhaust ports. Accordingly, the rate or amount of recirculated exhaust gases is closely related to the amount of exhaust gases emitted from the engine and the quantity of nitrogen oxides contained in the engine exhaust gases can be significantly reduced throughout various operating conditions of the engine operations. In this respect, it should be noticed that the characteristic of the amount of the exhaust recirculation can be freely varied by changing the profile of the valve head 32 disposed in the exhaust gas recirculation conduit 28.

Figure 3:
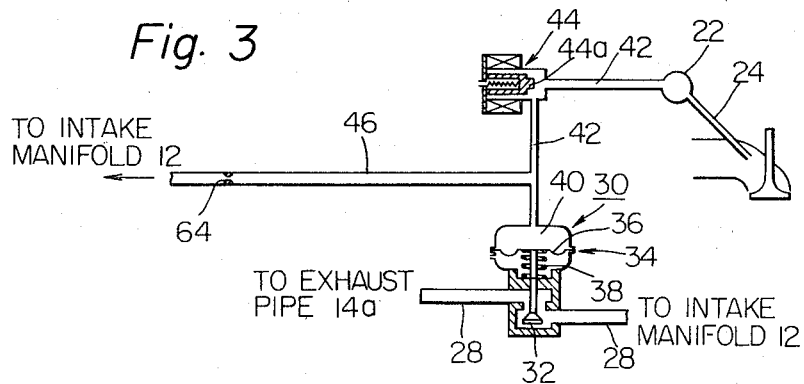
FIG. 3 is a view similar to FIG. 2 but shows a modification of the exhaust gas recirculation control shown in FIG. 2.

A modified form of the exhaust gas recirculation system of the present invention is illustrated in FIG. 3, wherein like or corresponding component parts are designated by the same reference numerals as in FIGS. 1 and 2. This modification differs from the system shown in FIGS. 1 and 2 in that the diaphragm device 48 is dispensed with and, instead of it, the branch passage 46 is directly connected to the intake manifold 12 of the engine 10 whereby the pressure of secondary air introduced into the control chamber 40 of the valve actuating device 30 can vary in accordance with the intake manifold vacuum. Indicated by reference numeral 64 is a flow restrictor which restricts the flow of secondary air to be delivered to the intake manifold 12. The exhaust gas recirculation system shown in FIG. 3 operates in a manner similar to that of FIGS. 1 and 2 and, therefore, a detail description of the same is herein omitted.

Figure 4:
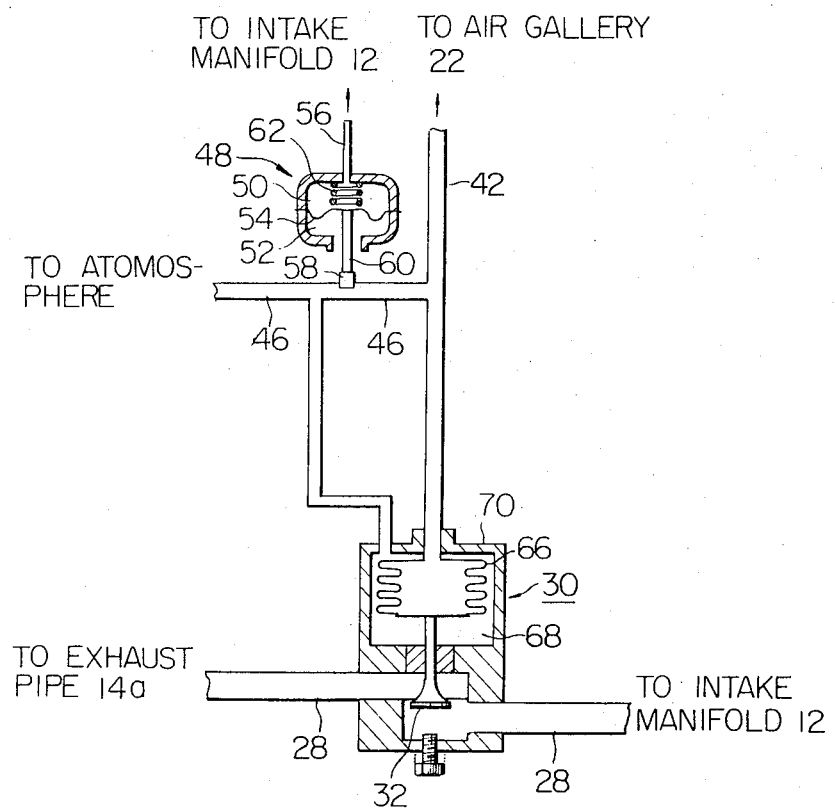
FIG. 4 is a view similar to FIG. 2 but shows another modification of the exhaust gas recirculation control shown in FIG. 2.

Another modified form of the exhaust gas recirculation system shown in FIGS. 1, 2 and 3 is illustrated in FIG. 4 wherein like or corresponding component parts are designated by the same reference numerals. In FIG. 4, the air gallery and the flow shut-off valve are not shown for the sake of simplicity of illustration. This modification differs from the embodiment shown in FIGS. 1, 2 and 3 in that the valve actuating device 30 is comprised of a bellows 66 which is operatively disposed in an atmospheric chamber 68 and which is connected to the valve head 32 extending downwardly in and from the atmospheric chamber 68. The bellows 66 has formed therein a control chamber 70 which communicates with the secondary air passage 42 leading to the secondary air gallery (not shown) to receive secondary air therefrom whereby the bellows can expand in a direction to cause the valve head 32 to open the exhaust gas recirculation conduit 28. The atmospheric chamber 68 is shown as communicating with the branch passage 46 at a point upstream of the diaphragm device 48 but may be directly vented to the atmosphere, if desired. The system shown in FIG. 4 also operates in a manner similar to that of FIGS. 1, 2 and 3 and, therefore, a detail description of the same is herein omitted for the sake of simplicity of description.

It will now be appreciated from the foregoing description that the exhaust gas recirculation system embodying the present invention is adapted to control the rate or amount of exhaust recirculation in dependence on the amount of exhaust gases emitted from the engine by utilizing the pressure of secondary air in the secondary air supplying device whereby the quantity of noxious nitrogen oxides in the engine exhaust gases can be significantly reduced without reducing the engine power output.

It should also be noted that the exhaust gas recirculation system of the present invention is comprised of a minimum number of component parts whereby the whole system is simple in construction and easy to manufacture.

What is claimed is:

1. An exhaust gas recirculation system for an internal combustion engine including an intake manifold, an exhaust manifold and a secondary air supply device having a pneumatic pump driven by said engine, an air gallery communicating with said pneumatic pump and at least one secondary air injection nozzle communicating with said air gallery and opening to said exhaust manifold to supply secondary air thereinto, said exhaust gas recirculation system comprising, in combination, conduit means extending between said exhaust manifold and said intake manifold for recirculating a portion of exhaust gases emitted into said exhaust manifold to said intake manifold, valve means interposed in said conduit means to control the amount of exhaust recirculation through said conduit means, valve actuating means having a movable member connected to a valve head of said valve means to control the movements thereof and having a control chamber communicating with said air gallery of said secondary air supply device to receive secondary air therefrom, said movable member of said valve actuating means being responsive to the pressure of said secondary air in said control chamber, and control means for controlling the pressure of said secondary air in said control chamber of said valve actuating means in dependence on the variation in intake manifold vacuum.

2. An exhaust gas recirculation system as claimed in claim 1, further comprising secondary air passage means connecting said control chamber of said valve actuating means to said air gallery of said secondary air supply device, and a flow shut-off valve disposed in said secondary air passage means to selectively open and close said secondary air passage means.

3. An exhaust gas recirculation system as claimed in claim 2, in which said control means includes branch passage means communicating with said secondary air passage means at a position between said control chamber of said valve actuating means and said flow shut-off valve and vented to the atmosphere, a valve element disposed in said branch passage means to control the effective cross-sectional area of said branch passage means, and a diaphragm device connected to said valve element to control the movements thereof in response to intake manifold vacuum.

4. An exhaust gas recirculation system as claimed in claim 3, in which said diaphragm device includes an atmospheric chamber, a vacuum chamber communicating with said intake manifold, a diaphragm member mounted between said atmospheric chamber and said vacuum chamber and connected to said valve element, and a compression spring mounted in said vacuum chamber for biasing said diaphragm member in a direction to cause said valve element to decrease the effective cross-sectional area of said branch passage means.

5. An exhaust gas recirculation system as claimed in claim 2, in which said control means includes branch passage means communicating at its one end with said secondary air passage means at a position between said control chamber of said valve actuating means and said flow shut-off valve, and a flow restrictor disposed in said branch passage means.

6. An exhaust gas recirculation system as claimed in claim 1, in which said movable member of said valve actuating means is a diaphragm member which is responsive to the pressure of said secondary air in said control chamber of said valve actuating means.

7. An exhaust gas recirculation system as claimed in claim 1, in which said movable member of said valve actuating means is a bellows which is responsive to the pressure of said secondary air in said control chamber of said valve actuating means.

* * * * *